United States Patent
Prasad

(10) Patent No.: US 11,544,153 B2
(45) Date of Patent: Jan. 3, 2023

(54) MEMORY ERROR HANDLING DURING AND/OR IMMEDIATELY AFTER A VIRTUAL MACHINE MIGRATION

(71) Applicant: International Business Machines Corporation, Armonk, NY (US)

(72) Inventor: Aravinda Prasad, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 321 days.

(21) Appl. No.: 16/816,653

(22) Filed: Mar. 12, 2020

(65) Prior Publication Data
US 2021/0286686 A1    Sep. 16, 2021

(51) Int. Cl.
| | | |
|---|---|---|
| *G06F 11/14* | (2006.01) | |
| *G06F 9/455* | (2018.01) | |
| *G06F 12/1009* | (2016.01) | |
| *G06F 11/20* | (2006.01) | |

(52) U.S. Cl.
CPC ...... *G06F 11/1469* (2013.01); *G06F 9/45558* (2013.01); *G06F 11/203* (2013.01); *G06F 12/1009* (2013.01); *G06F 2009/4557* (2013.01); *G06F 2212/657* (2013.01)

(58) Field of Classification Search
CPC ............... G06F 9/45558; G06F 9/4856; G06F 2009/4557; G06F 3/0646; G06F 3/0647; G06F 3/065; G06F 11/00; G06F 11/1453; G06F 11/1458; G06F 11/1469; G06F 11/203
See application file for complete search history.

(56) References Cited

U.S. PATENT DOCUMENTS

| | | | |
|---|---|---|---|
| 6,615,375 B1* | 9/2003 | Mounes-Toussi | ................. G06F 11/1666 714/54 |
| 9,116,811 B1* | 8/2015 | Derbeko | ............. G06F 11/1666 |
| 9,652,333 B1 | 5/2017 | Bournival | |
| 2009/0113109 A1* | 4/2009 | Nelson | ................ G06F 11/1484 718/1 |

(Continued)

OTHER PUBLICATIONS

Wikipedia's Page Table historical version published Jan. 19, 2020 https://en.wikipedia.org/w/index.php?title=Page_table&oldid=936594031 (Year: 2020).*

(Continued)

*Primary Examiner* — Joseph O Schell
(74) *Attorney, Agent, or Firm* — Aaron N. Pontikos

(57) ABSTRACT

According to aspects of the present disclosure, systems and methods can be provided to recover from memory errors that occur during or following a virtual machine migration. Methods, computer program products and/or systems are provided for handling memory error that perform the following operations: (i) obtaining a memory address that triggered an uncorrected error on a first host associated with a virtual machine migration; (ii) computing a page associated with the memory address; (iii) determining if a copy of the page associated with the memory address is available on a second host associated with the virtual machine migration; (iv) obtaining data from the copy of the page on the second host; and (v) generating a new page on the first host with the data obtained from the second host.

6 Claims, 3 Drawing Sheets

(56) References Cited

U.S. PATENT DOCUMENTS

| | | | |
|---|---|---|---|
| 2010/0299666 A1* | 11/2010 | Agbaria | G06F 11/2097 718/1 |
| 2014/0331015 A1* | 11/2014 | Prasad | G06F 12/126 711/159 |
| 2015/0378767 A1 | 12/2015 | Tarasuk-Levin | |
| 2016/0147620 A1* | 5/2016 | Lesartre | G06F 11/108 714/6.3 |
| 2016/0301428 A1* | 10/2016 | Andrade Costa | H03M 13/353 |
| 2017/0031745 A1* | 2/2017 | Koike | G06F 9/4856 |
| 2021/0216394 A1* | 7/2021 | Gadi | G06F 11/0727 |

OTHER PUBLICATIONS

A critical survey of live virtual machine migration techniques by Choudhary et al. Journal of Cloud Computing (Nov. 2017) https://journalofcloudcomputing.springeropen.com/track/pdf/10.1186/s13677-017-0092-1.pdf (Year: 2017).*

Pattabiraman, Karthik, "Intermittent Hardware Errors Recovery: Modeling and Evaluation", Posted on May 2, 2021, WordPress, 1 page.

Rashid, et al., "Intermittent Hardware Errors Recovery: Modeling and Evaluation", 2012 Ninth International Conference on Quantitative Evaluation of Systems, 10 pages. IEEE, DOI 10.1109/QEST.2012.37.

* cited by examiner

MEMORY ERROR HANDLING DURING AND/OR IMMEDIATELY AFTER A VIRTUAL MACHINE MIGRATION

BACKGROUND

The present disclosure relates generally to the field of memory error recovery, and more particularly to memory error recovery during and/or after virtual machine migration.

Errors in dynamic random access memory (DRAM) are a common form of hardware failure in modern computer systems. A memory error is an event that leads to the corruption of one or more bits in the memory. Memory errors can be caused by electrical or magnetic interference, can be due to problems with the hardware (e.g. a bit being permanently damaged), or due to corruption along the data path between the memories and the processing elements.

Enterprise systems can employ different mechanisms to recover from these errors. The recovery mechanism can be in the hardware or at the software level. At the hardware level, error correcting codes (ECC) can be used to recover from single bit errors and other techniques can be used to recover from multi-bit errors. However, hardware cannot recover from all kinds of memory errors. For example, hardware cannot recover from memory errors if the number of affected bits exceeds an ECC correctable limit. Memory errors that are automatically detected and corrected by hardware are categorized as corrected errors (CE) and memory errors that are detected by hardware, but that cannot be corrected, are categorized as uncorrected errors (UE).

Errors in DRAM devices are a major concern as they cause data corruption. For example, in many production environments, data corruption due to such memory errors may crash a system resulting in system downtimes. Hence, handling such errors is important as they can be considered one of the most common hardware problems that lead to a system crash. There is also a potential that advancing densities in DRAM technology might lead to increased memory errors, exacerbating this problem in the future.

In a virtual machine environment, UEs may be passed on to the hypervisor/virtual machine monitor (VMM) as a non-maskable interrupt for further handling. The hypervisor/VMM may then take suitable actions depending on the context in which the UE happened. For example, if a UE is triggered due to a memory region accessed by the hypervisor/VMM then the hypervisor/VMM may crash. If a UE is triggered due to a memory region accessed by a user process, then the user process is sent a bus error (SIGBUS). However, if the UE is triggered due to memory access by a virtual machine, then the UE is passed on to the kernel running inside the virtual machine. The kernel inside the virtual machine can similarly pass on the UE to the user process (for example bash process) inside a virtual machine if that address in error belongs to a user process. This avoids unnecessary termination of the entire virtual machine when UEs are triggered due to a memory access by a user process inside a virtual machine.

SUMMARY

According to an aspect of the present invention, there is a computer-implemented method, computer program product and/or system for handling memory error that performs the following operations (not necessarily in the following order): (i) obtaining a memory address that triggered an uncorrected error on a first host associated with a virtual machine migration; (ii) computing a page associated with the memory address; (iii) determining if a copy of the page associated with the memory address is available on a second host associated with the virtual machine migration; (iv) obtaining data from the copy of the page on the second host; and (v) generating a new page on the first host with the data obtained from the second host.

DETAILED DESCRIPTION

Figure 1:
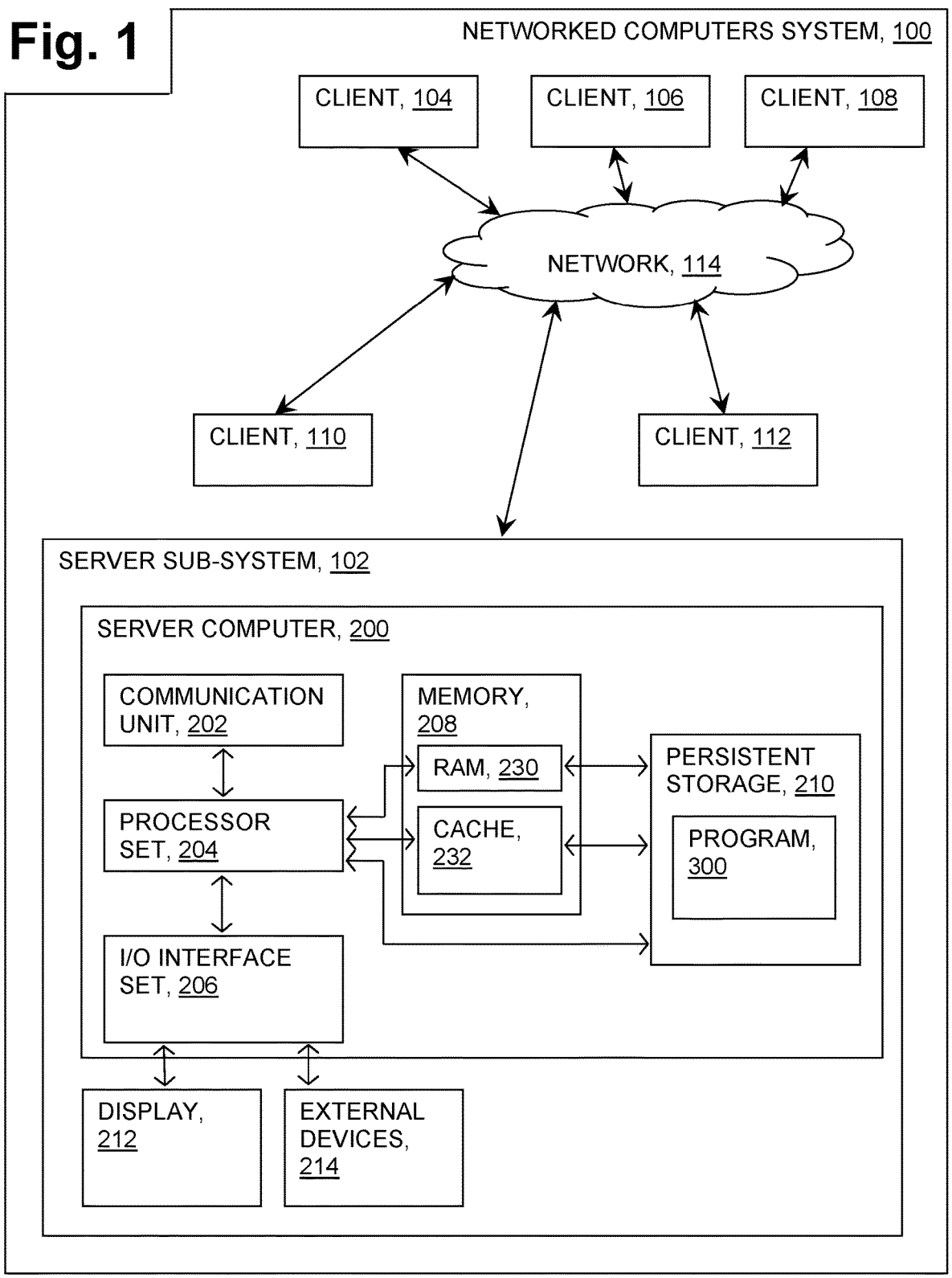
FIG. 1 is a block diagram view of a first embodiment of a system according to the present invention.

According to aspects of the present disclosure, systems and methods can be provided to recover from memory errors that occur during or following a virtual machine migration. In particular, systems and methods of the present disclosure can provide improved memory error recovery based on data replication resulting from the copy phase of a virtual machine migration. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-systems 102, 104, 106; client sub-systems 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section. As an example, a program 300 can comprise a virtual machine monitor, a virtual machine managed by a virtual machine monitor, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device(s) 208 and persistent storage device(s) 210 are computer-readable storage media. In general, memory device(s) 208 can include any suitable volatile or non-volatile computer-readable storage media. It is further noted that, now and/or in the near future: (i) external device set 214 may be able to supply, some or all, memory for sub-system 102; and/or (ii) devices external to sub-system 102 may be able to provide memory for sub-system 102.

Program 300 is stored in persistent storage device(s) 210 for access and/or execution by one or more of the respective computer processors in processor set 204, usually through one or more memories of memory device(s) 208. Persistent storage device(s) 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device(s) 210.

Program 300 may include both machine readable and performable instructions and/or substantive data (that is, the type of data stored in a database). In this particular embodiment, persistent storage device(s) 210 includes a magnetic hard disk drive. To name some possible variations, persistent storage device(s) 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device(s) 210 may also be removable. For example, a removable hard drive may be used for persistent storage device(s) 210. Other examples include optical and magnetic disks, thumb drives, and smart cards that are inserted into a drive for transfer onto another computer-readable storage medium that is also part of persistent storage device(s) 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device device(s) 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
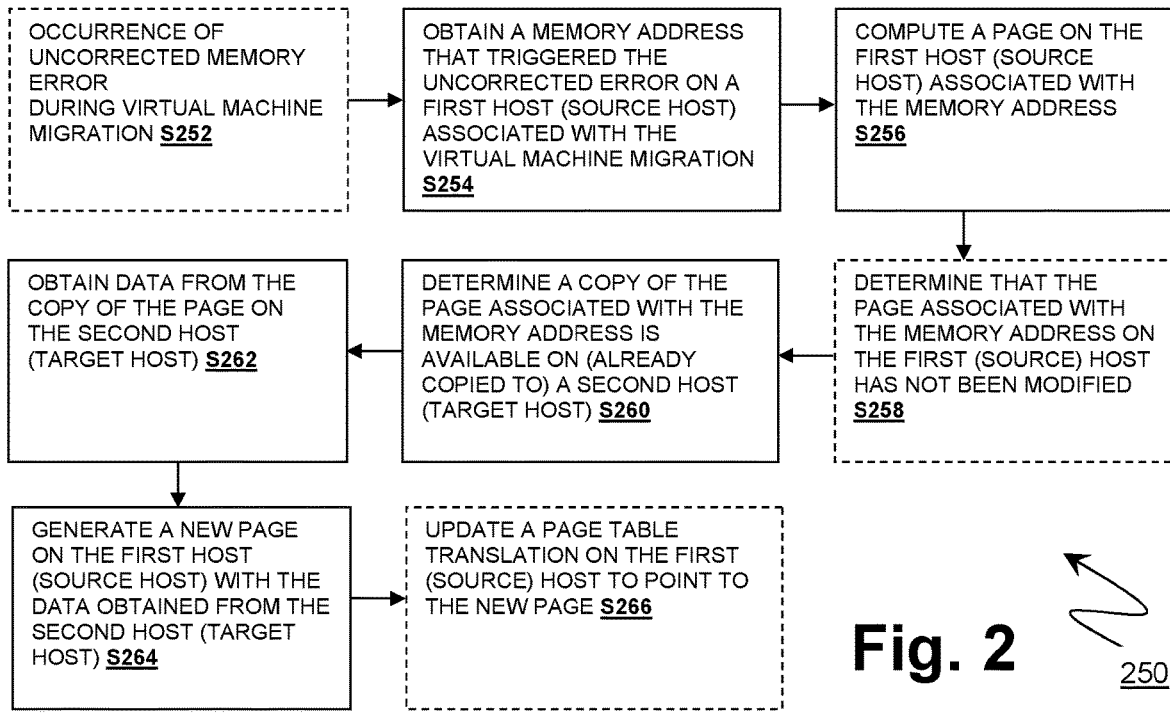
FIG. 2 is a flowchart showing a first embodiment method performed, at least in part, by the first embodiment system.
Figure 3:
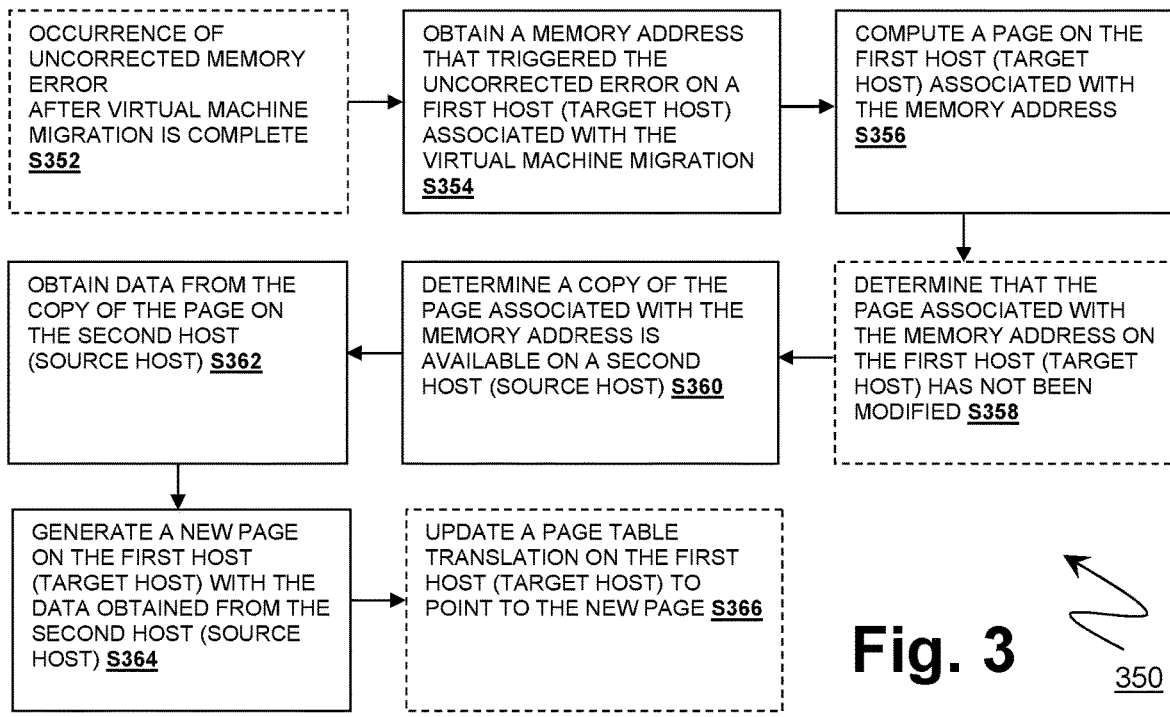
FIG. 3 is a flowchart showing a second embodiment method performed, at least in part, by the first embodiment system.
Figure 4:
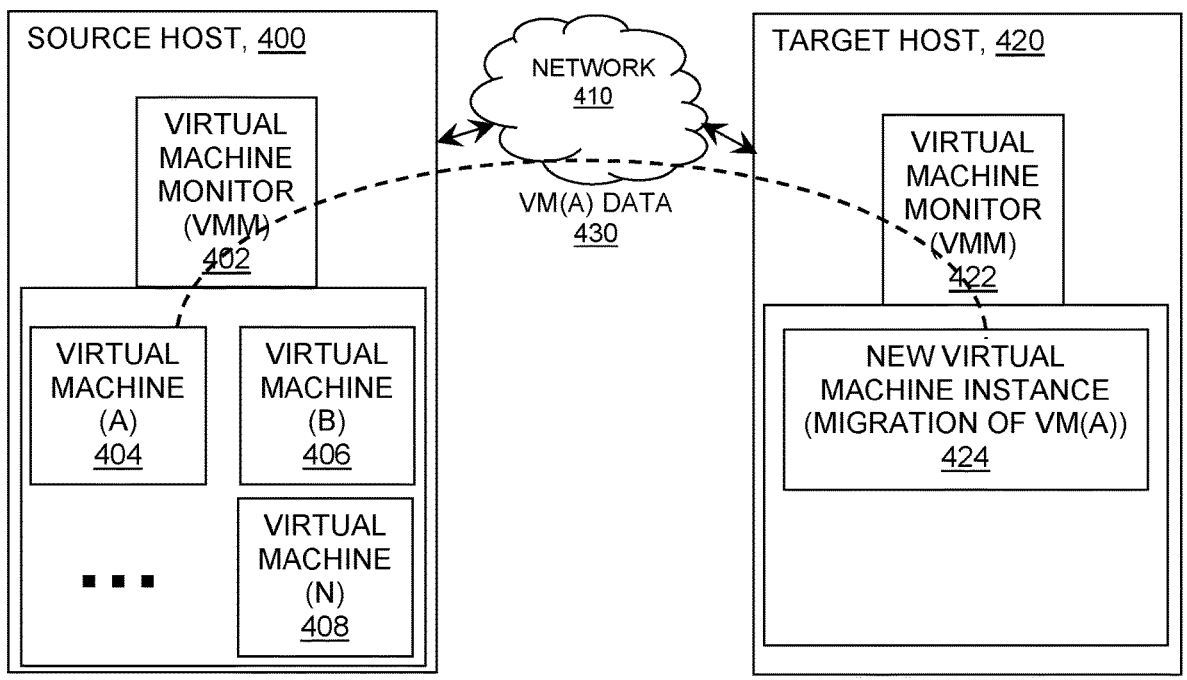
FIG. 4 is a block diagram view of a second embodiment of a system capable of performing the methods according to the present invention.

FIG. 2 shows flowchart 250 depicting a computer-implemented method according to the present invention. FIG. 3 shows flowchart 350 depicting another computer-implemented method according to the present invention. FIG. 4 shows an example embodiment of systems which can perform at least some of the method operations of flowchart 250 and/or flowchart 350. The methods and associated systems will now be discussed, over the course of the following paragraphs, with extensive reference to FIGS. 2 and 3 (for the method operation blocks), and FIG. 4 (for the hardware/software blocks).

FIG. 2 shows flowchart 250 depicting a method of error recovery during virtual machine migration according to the present invention. With regard to FIG. 2, one or more flowchart blocks may be identified with dashed lines and represent optional steps that may additionally be included, but which are not necessarily required, in the depicted embodiments. As illustrated in FIG. 2, in some embodiments, error recovery processing optionally begins at operation S252, where a memory error (e.g., an uncorrected error (UE)) occurs associated with a virtual machine (e.g., virtual machine (A) 404 of FIG. 4, and/or the like) running on a first host, such as source host 400 of FIG. 4, where the virtual machine is being migrated to another second host, such as target host 420 of FIG. 4. As described further herein, live virtual machine migration comprises migrating a virtual machine, such as virtual machine (A) 404, and its state from one system (e.g., server sub-system 102, source host 400, etc.) to a different system (e.g., server sub-system 104, target host 420, etc.) while the virtual machine is still running on the first system.

Processing proceeds to operation S254, where a VMM, such as VMM 402, obtains a memory address that triggered the error on the first, source host (e.g., source host 400)

while the virtual machine migration is in progress. For example, in some embodiments, the VMM may fetch the address that triggered the error from a register.

At operation S256, the VMM computes a page (e.g., determines a memory page to which a particular memory address is mapped) on the first, source host associated with the address that triggered the error (e.g., faulty address). Optionally, in some embodiments, at operation S258, the VMM can determine whether the page on the source host associated with the faulty address has been modified and only continues with the error recovery when the page on the source host has not been modified. In some embodiments, the VMM determines whether the memory page on the source host has been modified (e.g., some data associated with the memory page has been changed) since the migration was initiated and/or since the page was copied to the target host.

Processing proceeds to operation S260, where the VMM determines that a copy of the page associated with the faulty address on the first, source host (e.g., source host 400) has already been copied to the second, target host (e.g., target host 420), and is thus available on the target host for error recovery.

At operation S262, the VMM obtains data from the copied page on the target host (e.g., target host 420). Processing proceeds to operation S264, where the VMM generates a new page on the source host (e.g., source host 400) using the data obtained from the copied page on the target host (e.g., target host 420). For example, the VMM can copy the contents of the page from the target host to any new free page on the source host to recover from the memory error on the source host.

Optionally, in some embodiments, at operation S266, the VMM can update a page table translation on the source host to point to this newly created page on the source host to facilitate error recovery and resume operation of the virtual machine on the source host.

FIG. 3 shows flowchart 350 depicting a method of error recovery following completion of a virtual machine migration according to the present invention. With regard to FIG. 3, one or more flowchart blocks may be identified with dashed lines and represent optional steps that may additionally be included in some embodiments, but which are not required in all embodiments. As illustrated in FIG. 3, in some embodiments, error recovery processing optionally begins at operation 352, where a memory error (e.g., an uncorrected error (UE)) occurs associated with a virtual machine running on a first host, such as target host 420 of FIG. 4, where the virtual machine has been migrated from another second host, such as source host 400 of FIG. 4 (e.g., wherein the virtual machine migration to the target host has been completed).

Processing proceeds to operation S354, where a VMM, such as VMM 422, obtains a memory address that triggered the error on the first, target host (e.g., target host 420). For example, in some embodiments, the VMM may fetch the address that triggered the error from a register.

At operation S356, the VMM computes a page (e.g., memory page) on the first, target host (e.g., target host 420) associated with the address that triggered the error (e.g., faulty address). In some embodiments, at operation S358, the VMM can determine whether the page on the target host associated with the faulty address has been modified and only continues with the error recovery when the page on the target host has not been modified.

Processing proceeds to operation S360, where the VMM determines that a copy of the page associated with the faulty address on the first, target host (e.g., target host 420) is still available on the second, source host (e.g., source host 400), and is thus available on the source host for error recovery. For example, the VMM may determine that the memory page on the source host has not been reclaimed (e.g., overwritten) and is thus available to facilitate error recovery.

At operation S362, the VMM obtains data from the copy of the page on the source host (e.g., source host 400). Processing proceeds to operation S364, where the VMM generates a new page on the target host (e.g., target host 420) using the data obtained from the copy of the page on the source host (e.g., source host 400). For example, the VMM can copy the contents of copy of the page from the source host to any new free page on the target host to recover from the memory error on the target host.

In some embodiments, at operation S366, the VMM can update a page table translation on the target host to point to this newly created page on the target host to facilitate error recovery and resume operation of the virtual machine on the target host.

FIG. 4 illustrates an example embodiment of a system wherein virtual machine migration may occur in accordance with aspects of the present disclosure. FIG. 4 is a functional block diagram illustrating various portions of a networked computers system capable of hosting one or more virtual machines including: source host 400, target host 420; virtual machine monitors 402, 422; virtual machine (A) 404; virtual machine (B) 406; virtual machine (N) 408; new virtual machine (migrating virtual machine) 424; network 410; and virtual machine (A) migration data 430.

Source host 400 and target host 420 can comprise one or more of the components of server sub-system 102 as described with regard to FIG. 1. Virtual machine monitors 402 and 422 can comprise software, firmware, and/or hardware that can create and run virtual machines on the source host 400 and/or the target host 420 (e.g., program 300 of FIG. 1, etc.). Virtual machine (A) 404; virtual machine (B) 406; virtual machine (N) 408; and new virtual machine (migrating virtual machine) 424 comprise emulations of a computer system (guest machines) that can run on a source host 400 and/or a target host 420.

Live virtual machine migration comprises a process of migrating a virtual machine and its state from one hardware to a different hardware while the VM is still running. Live virtual machine migration typically involves transferring the entire virtual machine memory from one physical host (referred to as source host, e.g., source host 400) to another physical host (referred to as target host, e.g., target host 420). Live migration can be useful for a variety of reasons, such as balancing the load across several hosts in a server farm, bringing down some hosts for hardware or software maintenance while keeping the guests (virtual machines) running, and/or to consolidate virtual machines on to a subset of hosts to save power consumption.

FIG. 4 shows as example embodiment wherein virtual machine (A) 404 is being migrated from source host 400 to target host 420, thereby creating a new instance of migrating virtual machine (A) 424 on the target host 420. The virtual machine (A) 404 continues running normally (e.g., on source host 400) during the migration and does not even realize that the migration to the target host 420 is taking place.

The VMM 402 first transfers the entire VM's memory (e.g., virtual machine (A) data 430) to the target host in the background (referred to as the copy phase) and initiates the actual migration of the virtual machine (A) 404 (e.g., to run the virtual machine on the target host and stop the virtual machine on the source host) once the memory copy is complete. The copy phase of the virtual machine migration may last for several hours as the rate at which the virtual machine's data is copied to the target host 420 may be capped to minimize the impact on the performance of other virtual machines, for example, due to increased memory bandwidth utilization during migration. Additionally, the probability of experiencing memory errors can increase during virtual machine migration due to an increase in the memory activity.

The lengthy copy phase that lasts for several hours opens more opportunities to recover from memory errors during the virtual machine migration. The copy phase of the virtual machine migration leads to the virtual machine memory being replicated across the source host 400 and target host 420 while the virtual machine migration is taking place.

In an example embodiment, a virtual machine migration can comprise the following phases: setup phase, copy phase, migrate phase, commit phase, and clean-up phase.

During the setup phase, VMM 402 and VMM 422 can set up the source host 400 and target host 420 for the migration by starting an instance on the target host 420 and establishing a connection between the processes on the source host 400 and target host 420.

During the copy phase, VMM 402 can identify the virtual machine (A) 404 memory regions and start transferring the entire virtual machine (A) memory region (e.g., VM(A) data 430, etc.) to the destination VMM process (e.g., VMM 422, etc.). To avoid impacting the performance of other virtual machines running on both the source host 400 and the target host 420, the amount of memory that is transferred can be rate limited. Hence, the copy phase of a virtual machine migration can typically take several hours. However, as the virtual machine (A) 404 is still actively running on the source host 400, it can continue to access and modify the copied pages. The VMM monitors such memory page modifications and recopies the modified pages to the target host 420.

During the migrate phase, VMM 402 can transfer any other required virtual machine (A) 404 states. During the commit phase, virtual machine (A) 404 is stopped on the source host 400 and new migrated virtual machine (A) 424 is started on the target host 420. The virtual machine would then continue execution on the target host 420. During the clean-up phase, VMM 402 can release the virtual machine (A) 404 memory on the source host.

III. Further Comments and/or Embodiments

Some embodiments of the present invention recognize the following facts, potential problems and/or potential areas for improvement with respect to the current state of the art. Handling memory errors during virtual machine migration is important because the copy phase of the migration can last for several hours and the probability of experiencing memory errors can increase during migration due to increases in the memory activity. Memory errors can constitute a significant portion of overall hardware failures and such errors can happen any time. In a cloud-based environment, having data replication or memory mirroring at such a large scale is not a viable solution. Hence, the present invention provides improved solutions that strive to recover from memory errors during crucial operations such as virtual machine migration.

Some embodiments of the present invention may include demand-associated clean-up (e.g., reclaiming) of the memory pages (also referred to as "lazy memory reclaim-ing") on the source host once a virtual machine migration is complete. For example, a VMM may execute a clean-up phase on the source host once a virtual machine migration has been completed whereby the virtual machine memory on the source host (e.g., memory used by the virtual machine during execution on the source host prior to the migration to the target host) is released for reuse (e.g., identified as available memory space to be used by other processes, etc.) Alternatively, in some embodiments, lazy reclaiming of the memory pages may only free up the migrated virtual machine's memory pages on the source host only when the memory pressure on the source host increases such that it needs additional available memory, allowing for at least some of the data associated with the migrated virtual machine's memory on the source host to be available for a longer period to facilitate memory error recovery associated with the migrated virtual machine on the target host. This lazy reclaiming of the migrated virtual machine's memory pages can increase the chance of error recovery when a memory error occurs on the target host.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method for memory error recovery, the method comprising:
   obtaining, during migration of a virtual machine from a source host to a target host, a memory address that triggered an uncorrected error on the source host;
   determining whether a page associated with the memory address on the source host has been modified;
   responsive to determining that the page associated with the memory address on the source host has not been modified:
      determining if a copy of the page associated with the memory address is available on the target host;
      obtaining data from the copy of the page on the target host; and
      generating a new page on the source host with the data obtained from the target host.

2. The computer-implemented method of claim 1, wherein generating the new page on the source host with the data obtained from the target host further comprises updating a page table translation on the source host to point to the new page.

3. A computer program product for memory error recovery, the computer program product comprising a computer readable storage medium having stored thereon:
   program instructions programmed to obtain, during migration of a virtual machine from a source host to a target host, a memory address that triggered an uncorrected error on the source host;
   program instructions programmed to determine whether a page associated with the memory address on the source host has been modified;
   responsive to determining that the page associated with the memory address on the source host has not been modified:
      program instructions programmed to determine if a copy of the page associated with the memory address is available on the target host;
      program instructions programmed to obtain data from the copy of the page on the target host; and
      program instructions programmed to generate a new page on the first source host with the data obtained from the target host.

4. The computer program product of claim 3, wherein generating the new page on the source host with the data obtained from the target host further comprises updating a page table translation on the source host to point to the new page.

5. A computer system for memory error recovery, the computer system comprising:
   a processor(s) set; and
   a computer readable storage medium;
   wherein:
      the processor set is structured, located, connected and/or programmed to run program instructions stored on the computer readable storage medium; and
      the stored program instructions include:
         program instructions programmed to obtain, during migration of a virtual machine from a source host to a target host, a memory address that triggered an uncorrected error on the source host;
         program instructions programmed to determine whether a page associated with the memory address on the source host has been modified;
         responsive to determining that the page associated with the memory address on the source host has not been modified:
            program instructions programmed to determine if a copy of the page associated with the memory address is available on the target host;
            program instructions programmed to obtain data from the copy of the page on the target host; and
            program instructions programmed to generate a new page on the source host with the data obtained from the target host.

6. The computer system of claim 5, wherein generating the new page on the source host with the data obtained from the target host further comprises updating a page table translation on the source host to point to the new page.

* * * * *